US008437886B1

(12) United States Patent
Yang

(10) Patent No.: US 8,437,886 B1
(45) Date of Patent: May 7, 2013

(54) VEHICLE USE CONTROL SYSTEM AND METHOD THEREOF

(75) Inventor: Hong-Yu Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/584,772

(22) Filed: Aug. 13, 2012

(30) Foreign Application Priority Data

Mar. 13, 2012 (CN) .......................... 2012 1 0064723

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC .................. 701/2; 701/53; 701/58; 701/112; 701/32.6

(58) Field of Classification Search ............. 701/2, 32.6, 701/53, 58, 112
See application file for complete search history.

(56) References Cited

U.S. PATENT DOCUMENTS

| | | | | |
|---|---|---|---|---|
| 4,898,010 | A * | 2/1990 | Futami et al. | 70/278.1 |
| 6,718,240 | B1 * | 4/2004 | Suda et al. | 701/36 |
| 6,798,336 | B2 * | 9/2004 | Kanda et al. | 340/5.61 |
| 7,042,334 | B2 * | 5/2006 | Mosgrove et al. | 340/5.73 |
| 8,196,694 | B2 * | 6/2012 | Biondo et al. | 180/272 |
| 2011/0160934 | A1 * | 6/2011 | Harata | 701/2 |
| 2011/0313922 | A1 * | 12/2011 | Ben Ayed | 705/42 |
| 2011/0314539 | A1 * | 12/2011 | Horton | 726/20 |
| 2012/0133563 | A1 * | 5/2012 | Naka | 343/713 |
| 2012/0229253 | A1 * | 9/2012 | Kolar | 340/5.61 |

FOREIGN PATENT DOCUMENTS

TW M314142 6/2007

* cited by examiner

*Primary Examiner* — Calvin Cheung
(74) *Attorney, Agent, or Firm* — Altis Law Group, Inc.

(57) ABSTRACT

A vehicle use control system and method are provided. The vehicle use control system includes a vehicle unlocking unit, a vehicle control unit, and at least one mobile communication unit. One mobile communication unit transmits a request to use a vehicle to the vehicle unlocking unit. The vehicle unlocking unit receives the request and generates a first prompt to a key holder which prompts whether to accept the request, and if an approval is received, the vehicle unlocking unit generates a first authentication information to the vehicle control unit and the mobile communication unit. The mobile communication unit acquires a second authentication information in response to user input to the vehicle control unit. If the second authentication information matches the first authentication information, the vehicle control unit unlocks the vehicle and allows the vehicle to be started up.

14 Claims, 2 Drawing Sheets

VEHICLE USE CONTROL SYSTEM AND METHOD THEREOF

BACKGROUND

1. Technical Field

The disclosure relates to vehicle management systems and, more particularly, to a vehicle use control system and a control method adapted for the system.

2. Description of Related Art

A vehicle is often supplied with two keys used to unlock and start up the vehicle. A person who needs to operate the vehicle has to have one of the keys to get access to and start up the vehicle, if he or she does not have the key, he or she will not be able to use the vehicle, even in emergency situations.

Therefore, what is needed is a vehicle use control system for unlocking a vehicle when there is no key to overcome the described shortcoming.

DETAILED DESCRIPTION

Figure 1:
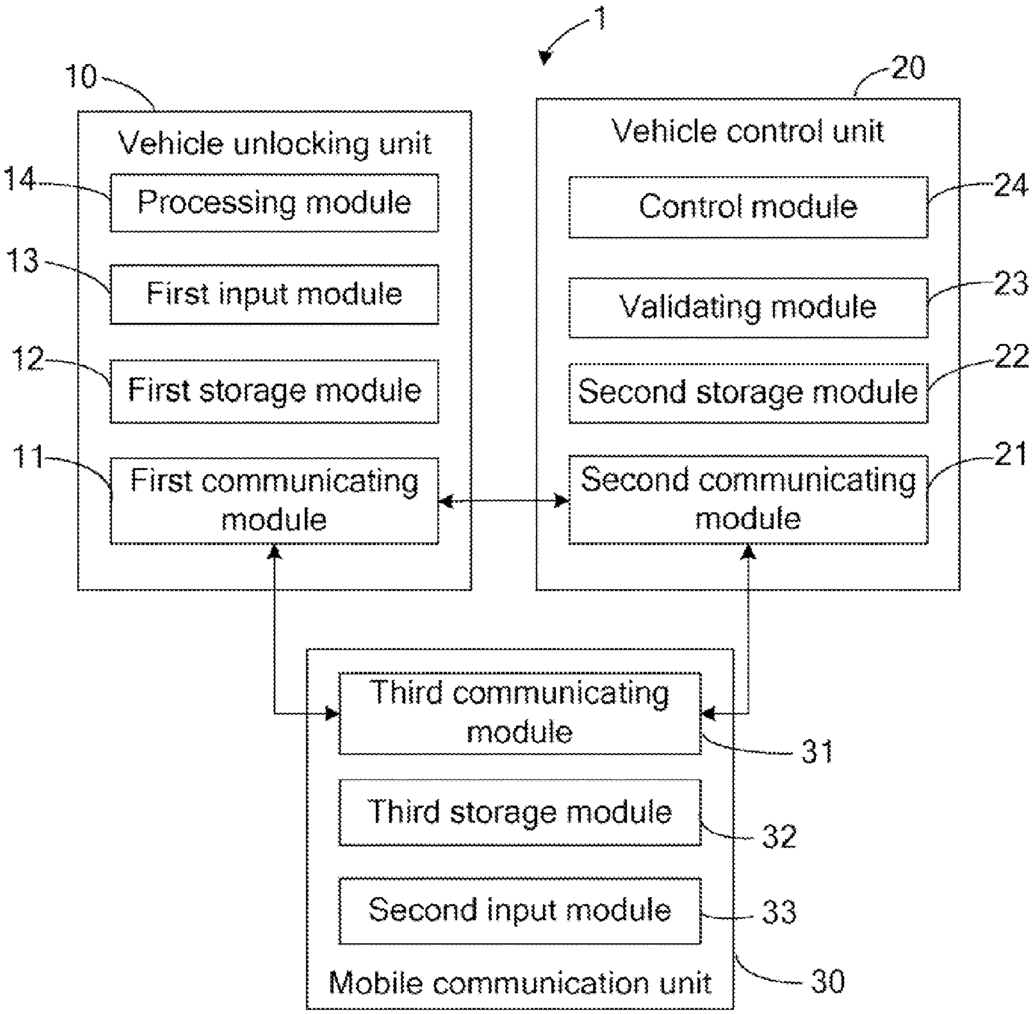
FIG. 1 is a block diagram of a vehicle use control system in accordance with an exemplary embodiment.

FIG. 1 is a block diagram of a vehicle use control system in accordance with an exemplary embodiment. The vehicle use control system (hereinafter "system") 1 includes a vehicle unlocking unit 10, a vehicle control unit 20, and at least one mobile communication unit 30. The vehicle unlocking unit 10, the vehicle control unit 20, and the at least one mobile communication unit 30 may communicate each other. The vehicle unlocking unit 10 is embedded in a key of a vehicle (not shown), the key having one or more electronic functions (hereinafter "electronic key"). The electronic key is carried by a user of the vehicle. The vehicle control unit 20 is embedded in a vehicle and is utilized for controlling the vehicle. Each of the at least one mobile communication units 30 is embedded in a wireless electronic device (not shown), such as a mobile phone or a PDA. The mobile communication unit 30 is carried by another user who does not possess an electronic key.

The vehicle unlocking unit 10 includes a first communicating module 11, a first storage module 12, a first input module 13, and a processing module 14. The vehicle control unit 20 includes a second communicating module 21, a second storage module 22, a validating module 23, and a control module 24. Each of the at least one mobile communication units 30 includes a third communicating module 31, a third storage module 32, and a second input module 33.

The second input module 33 generates a request for using the vehicle in response to user input, for example, pressing an button from the mobile communication unit 30, and the third communicating module 31 sends the request to the vehicle unlocking unit 10. In the embodiment, the third storage module 32 stores an ID corresponding to the mobile communication unit 30, and the request includes the ID and a duration of the proposed use of the vehicle. When the first communicating module 11 of the vehicle unlocking unit 10 receives the request, the processing module 14 generates a message (first prompt), which invites the holder of the electronic key to accept the request. If the first input module 13 generates an approval from the holder of the electronic key in response to the first prompt, such as, touching a key from the vehicle unlocking unit 10, the processing module 14 generates a first authentication information and controls the first communicating module 11 to send the first authentication information to the vehicle control unit 20 and to the mobile communication unit 30. Both the vehicle control unit 20 and the mobile communication unit 30 store the first authentication information to the second and the third storage modules 22, 32 respectively.

The second input module 33 acquires a second authentication information in response to user input from a person who possesses the mobile communication unit 30, and sends the second authentication information to the vehicle control unit 20. The validating module 23 acquires the second authentication information sent by the mobile communication unit 30 and determines whether the second authentication information sent by the mobile communication unit 30 matches the first authentication information in the second storage module 22 received from the vehicle unlocking unit 10. If the second authentication information sent by the mobile communication unit 30 matches the first authentication information in the second storage module 22 received from the vehicle unlocking unit 10, the control module 24 unlocks the vehicle and allows the vehicle to be started up, therefore, the user of the mobile communication unit 30 can enter and drive the vehicle.

In the embodiment, the authentication information includes a verification code generated randomly and an allowed duration for the use of the vehicle. For example, the user of the vehicle unlocking unit 10 may allow the person of the mobile communication unit 30 to use the vehicle for three hours only. The control module 24 further determines whether the current use of the vehicle is equal to the allowed duration of use. If the current use of the vehicle is equal to the allowed duration, the control module 24 generates and sends a further message (second prompt), which gives information as to the current length of use and/or the present permission has expired and invites reapplication to use the vehicle, to the person of the mobile communication unit 30, through the second communicating module 21. If the control module 24 does not receive a request from the mobile communication unit 30 within a predetermined period, the control module 24 shuts down the vehicle.

In another embodiment, the first storage module 12 stores a plurality of IDs corresponding to the vehicle unlocking unit 10. The first input module 13 generates a control command for starting up the vehicle in response to user input. The processing module 14 controls the first communicating module 11 to send an ID from the first storage module 12 to the vehicle control unit 20. The second storage module 22 of the vehicle control unit 20 stores certification information. The second communicating module 21 receives the ID from the vehicle unlocking unit 10, and the validating module 23 retrieves the ID from the vehicle unlocking unit 10 and determines whether the ID from the vehicle unlocking unit 10 matches the certification information in the second storage module 22. If the ID from the vehicle unlocking unit 10 matches the certification information, the control module 24 unlocks the vehicle and allows the vehicle to be started up.

The control module 24 further acquires the current position information of the vehicle and controls the second communicating module 21 to send the current position information to the vehicle unlocking unit 10 in real time in the course of driving, therefore, the user who has the electronic key of the vehicle may know the position of the vehicle in real time at all times.

The processing module 14 further encrypts the ID before the first communicating module 11 sends the ID to the vehicle control unit 20. The validating module 23 decrypts the ID from the vehicle unlocking unit 10 before determining whether the ID from the vehicle unlocking unit 10 matches the certification information.

Further, the processing module 14 encrypts the first authentication information before the first communicating module 11 sends the first authentication information to the vehicle control unit 20. The validating module 23 decrypts the second authentication information before determining whether the second authentication information sent by the mobile communication unit 30 matches the first authentication information in the second storage module 22 received from the vehicle unlocking unit 10.

Figure 2:
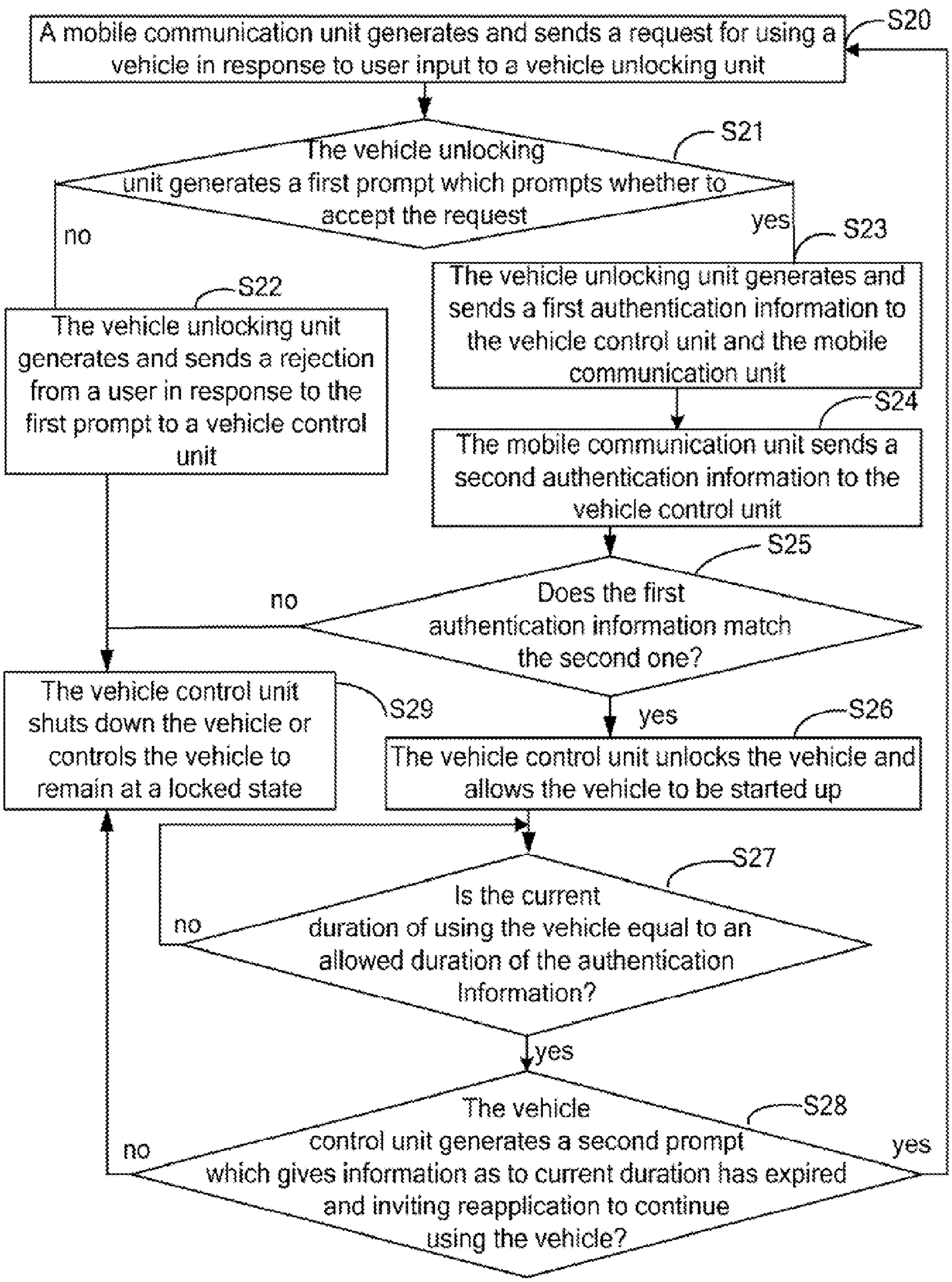
FIG. 2 is a flowchart of a method for unlocking a vehicle adapted for the system of FIG. 1.

FIG. 2 is a flowchart of a method for unlocking a vehicle and allowing it to be started up, adapted for the system of FIG. 1.

In step S20, the mobile communication unit 30 generates a request for using a vehicle in response to user input and sends the request to the vehicle unlocking unit 10.

In step S21, the vehicle unlocking unit 10 receives the request and generates a first prompt which prompts the holder of the electronic key whether or not to accept the request. In step S22, if the vehicle unlocking unit 10 generates a rejection from the user of the electronic key in response to the first prompt, the vehicle unlocking unit 10 sends the rejection to the vehicle control unit 20. In step S29, the vehicle control unit 20 controls the vehicle to remain at a locked state.

In step S23, if an approval from the user of the electronic key is received in response to the first prompt, the vehicle unlocking unit 10 generates a first authentication information and sends the first authentication information to the vehicle control unit 20 and the mobile communication unit 30. In step S24, the mobile communication unit 30 sends a second authentication information to the vehicle control unit 20.

In step S25, the vehicle control unit 20 determines whether the second authentication information sent by the mobile communication unit 30 matches the first authentication information received from the vehicle control unit 20. In step S26, if the second authentication information sent by the mobile communication unit 30 matches the first authentication information received from the vehicle control unit 20, that is, the first authentication information is the same as the second authentication information, the vehicle control unit 20 unlocks the vehicle and allows the vehicle to be started up. If the second authentication information sent by the mobile communication unit 30 does not match the first authentication information received from the vehicle unlocking unit 10, the step goes back to S29.

In step S27, the vehicle control unit 20 determines whether the current duration of use of the vehicle is equal to the allowed duration of use according to the authentication information. In step S28, if the current duration of use of the vehicle is equal to the allowed duration, the vehicle control unit 20 generates and sends a second prompt which gives information as to the current duration of using the vehicle has expired and inviting reapplication to continue using the vehicle, and the step goes back to S20. In step S29, if the mobile communication unit 30 does not generate a request within a predetermined time, the vehicle control unit 20 shuts down the vehicle.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A vehicle use control system comprising:

a vehicle unlocking unit comprising a first communicating module, a first storage module, a first input module, and a processing module;

a vehicle control unit comprising a second communicating module, a second storage module, a validating module, and a control module; and at least one mobile communication unit, each of the at least one mobile communication unit comprising a third communicating module, a third storage module, and a second input module;

wherein the second input module of the at least one mobile communication unit generates a request for using a vehicle in response to user input, the third communicating module sends the request to the vehicle unlocking unit, when the first communicating module of the vehicle unlocking unit receives the request, the processing module generates a first prompt which prompts a holder of the vehicle unlocking unit whether or not to accept the request, responsive to the first input module generates an approval from the holder in response to the first prompt, the processing module generates a first authentication information and controls the first communicating module to send the first authentication information to the vehicle control unit and the mobile communication unit;

the second input module acquires a second authentication information in response to user input from a person who possesses the mobile communication unit, and sends the second authentication information to the vehicle control unit, the validating module determines whether the second authentication information sent by the mobile communication unit matches the first authentication information in the second storage module received from the vehicle unlocking unit, and responsive to the second authentication information sent by the mobile communication unit matches the first authentication information in the second storage module received from the vehicle unlocking unit, the control module unlocks the vehicle and allows the vehicle to be started up.

2. The vehicle use control system as recited in claim 1, wherein the third storage module stores an ID corresponding to the mobile communication unit, and the request sent by the mobile communication unit comprises the ID and a duration of the proposed use of the vehicle.

3. The vehicle use control system as recited in claim 1, wherein the first storage module stores a plurality of IDs corresponding to the vehicle unlocking unit, the first input module generates a control command for starting up the vehicle in response to user input, the processing module controls the first communicating module to send an ID from the first storage module to the vehicle control unit;

the second storage module of the vehicle control unit stores a certification information, the second communicating module receives the ID from the vehicle unlocking unit, the validating module acquires the ID from the vehicle unlocking unit and determines whether the ID from the vehicle unlocking unit matches the certification information in the second storage module, responsive to the ID from the vehicle unlocking unit matches the certification information, the control module unlocks the vehicle and allows the vehicle to be started up.

4. The vehicle use control system as recited in claim 3, wherein the processing module further encrypts the ID before the first communicating module sends the ID to the vehicle control unit, and the validating module further decrypts the ID from the vehicle unlocking unit before determining whether the ID from the vehicle unlocking unit matches the certification information.

5. The vehicle use control system as recited in claim 1, wherein the vehicle unlocking unit is embedded in an electronic key of the vehicle and the electronic key is carried by a user of the vehicle, the vehicle control unit is embedded in the vehicle, and each of the at least one mobile communication unit is embedded in a wireless electronic device.

6. The vehicle use control system as recited in claim 1, wherein the first authentication information comprises a verification code generated randomly and an allowed duration for using the vehicle.

7. The vehicle use control system as recited in claim 6, wherein the control module further determines whether the current duration of using the vehicle is equal to the allowed duration of at least one of the first and the second authentication information, responsive to the current duration of using the vehicle is equal to the allowed duration, the control module generates a second prompt which gives information as to the current duration of using the vehicle has expired and invites reapplication to use the vehicle, and controls the second communicating module to send the second prompt to the mobile communication unit, responsive to the mobile communication unit does not generate a request within a predetermined period, the control module shuts down the vehicle.

8. The vehicle use control system as recited in claim 1, wherein the control module further acquires the current position information of the vehicle and controls the second communicating module to send the current position information to the vehicle unlocking unit in real time in the course of driving.

9. The vehicle use control system as recited in claim 1, wherein the processing module further encrypts the first authentication information before the first communicating module sends the first authentication information to the vehicle control unit, and the validating module decrypts the second authentication information before determining whether the second authentication information sent by the mobile communication unit matches the first authentication information in the second storage module received from the vehicle unlocking unit.

10. A vehicle use control method comprising:

one mobile communication unit generating a request for using a vehicle in response to user input and sending the request to a vehicle unlocking unit;

the vehicle unlocking unit receiving the request and generating a first prompt which prompts a holder of the vehicle unlocking unit whether or not to accept the request;

responsive to the vehicle unlocking unit generating a rejection from the holder in response to the first prompt and sending a rejection to the vehicle control unit, the vehicle control unit remaining at a locked state;

responsive to generating an approval from the holder in response to the first prompt, the vehicle unlocking unit further generating a first authentication information and sending the first authentication information to the vehicle control unit and the mobile communication unit;

the mobile communication unit sending a second authentication information to the vehicle control unit;

the vehicle control unit determining whether the second authentication information sent by the mobile communication unit matches the first authentication information received from the vehicle unlocking unit;

responsive to the second authentication information sent by the mobile communication unit matches the first authentication information received from the vehicle unlocking unit, the vehicle control unit unlocking the vehicle and allowing the vehicle to be started up; and responsive to the second authentication information sent by the mobile communication unit does not match the first authentication information received from the vehicle unlocking unit, the vehicle control unit remaining at the locked state.

11. The vehicle use control method as recited in claim 10, wherein the first authentication information comprises a verification code generated randomly and an allowed duration of using the vehicle.

12. The vehicle use control method as recited in claim 11, further comprising:

the vehicle control unit determining whether a current duration of using the vehicle is equal to the allowed duration;

responsive to the current duration of using the vehicle is equal to the allowed duration, the vehicle control unit generating a second prompt which gives information as to the current duration of using the vehicle has expired and inviting reapplication to use the vehicle, and sending the second prompt to the mobile communication unit; and responsive to the mobile communication unit does not generate a request within a predetermined time, the vehicle control unit shutting down the vehicle.

13. The vehicle use control method as recited in claim 10, wherein the mobile communication unit stores an ID corresponding to the mobile communication unit, and the request sent by the mobile communication unit comprises the ID and a duration of the proposed use of the vehicle.

14. The vehicle use control method as recited in claim 10, wherein the vehicle unlocking unit is embedded in an electronic key of the vehicle and the electronic key is carried by a user of the vehicle, the vehicle control unit is embedded in the vehicle, and each of the at least one mobile communication unit is embedded in a wireless electronic device.

* * * * *